(12) United States Patent
Sakurai

(10) Patent No.: US 8,453,007 B2
(45) Date of Patent: May 28, 2013

(54) STORAGE DEVICE AND RECOVERY METHOD

(75) Inventor: Hiroshi Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 935 days.

(21) Appl. No.: 12/500,985

(22) Filed: Jul. 10, 2009

(65) Prior Publication Data

US 2009/0276656 A1 Nov. 5, 2009

Related U.S. Application Data

(63) Continuation of application No. PCT/JP2007/051195, filed on Jan. 25, 2007.

(51) Int. Cl.
*G06F 11/00* (2006.01)

(52) U.S. Cl.
USPC .............................. 714/3; 714/25; 714/6.22

(58) Field of Classification Search
USPC .................... 714/1, 3, 25, 42, 6.22
See application file for complete search history.

(56) References Cited

U.S. PATENT DOCUMENTS

| | | |
|---|---|---|
| 6,192,484 B1 | 2/2001 | Asano |
| 6,701,392 B1 | 3/2004 | Halstead et al. |
| 6,862,632 B1 | 3/2005 | Halstead et al. |
| 2002/0188748 A1* | 12/2002 | Blackwell et al. ............ 709/232 |
| 2004/0093538 A1* | 5/2004 | Hester et al. ..................... 714/45 |
| 2007/0101187 A1* | 5/2007 | Daikokuya et al. ................ 714/6 |
| 2007/0168701 A1* | 7/2007 | Prabhakaran ...................... 714/6 |
| 2007/0174657 A1* | 7/2007 | Ahmadian et al. ................. 714/4 |

FOREIGN PATENT DOCUMENTS

| | | |
|---|---|---|
| JP | 58-62899 | 4/1983 |
| JP | 3-141073 | 6/1991 |
| JP | 3-229331 | 10/1991 |
| JP | 7-56694 | 3/1995 |
| JP | 8-292904 | 11/1996 |
| JP | 9-185460 | 7/1997 |
| JP | 10-254636 | 9/1998 |
| JP | 10-289065 | 10/1998 |
| JP | 11-328823 | 11/1999 |
| JP | 2003-167682 | 6/2003 |
| JP | 2003-223349 | 8/2003 |
| JP | 2005-250827 | 9/2005 |
| JP | 2006-155662 | 6/2006 |

OTHER PUBLICATIONS

International Search Report mailed May 1, 2007 for corresponding International Application No. PCT/JP2007/051195.
Partial English Translation of Japanese Office Action mailed Nov. 15, 2011 issued in corresponding Japanese Patent Application No. 2008-554943.

* cited by examiner

*Primary Examiner* — Scott Baderman
*Assistant Examiner* — Sarai Butler
(74) *Attorney, Agent, or Firm* — Staas & Halsey LLP

(57) ABSTRACT

A storage device including a plurality of storage units for storing data dispersively among the storage units, includes: a processor for controlling boot-up of the storage units; and a memory for storing operation history indicative of the sequence of any failure causing any of the storage units to become inoperative, the processor controlling reboot-up of the storage units, when a plurality of the storage units becomes inoperative on account of a plurality of failures, in accordance with process including: determining the order of the reboot up of the storage units that is reversal of the sequence of the failures causing the storage units to become inoperative in reference to the operation history in the memory; rebooting the inoperative storage units successively in accordance with the determined order.

11 Claims, 19 Drawing Sheets

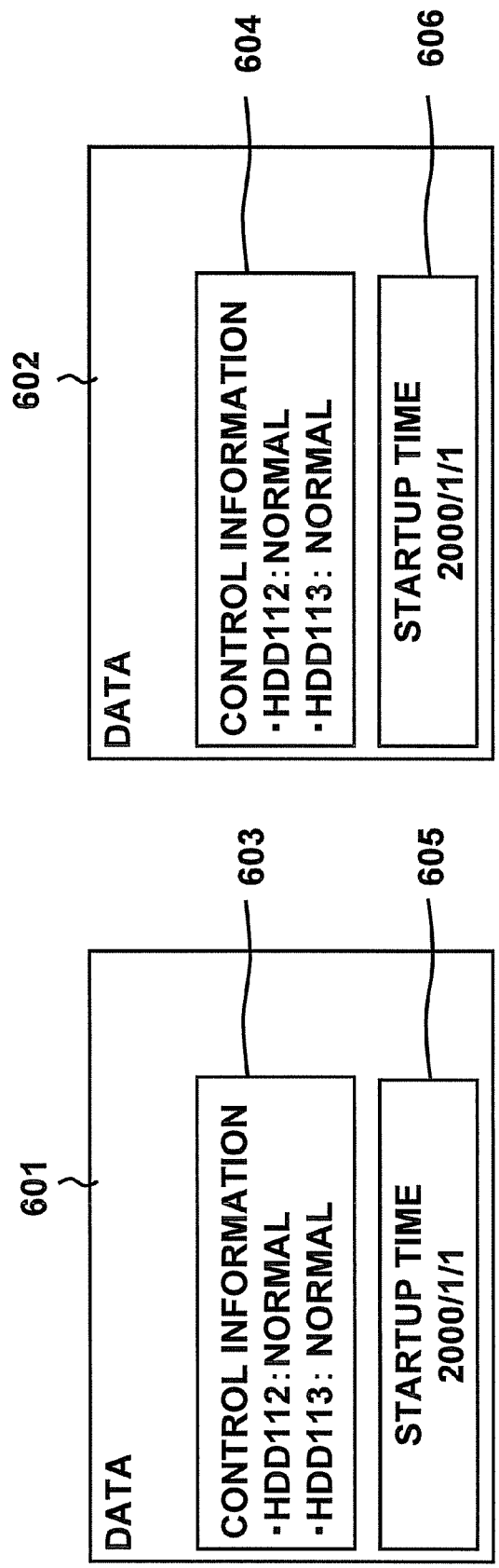

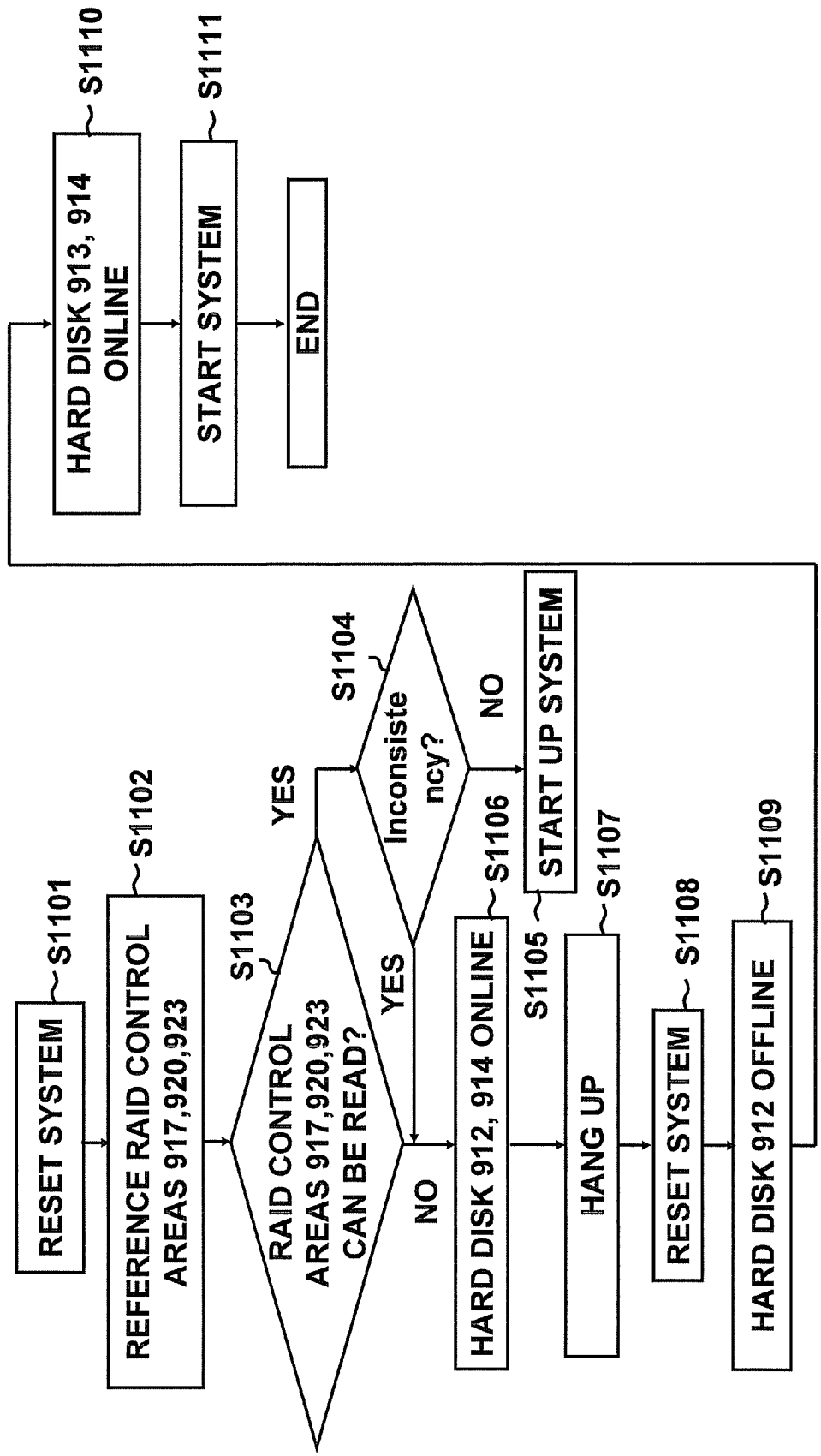

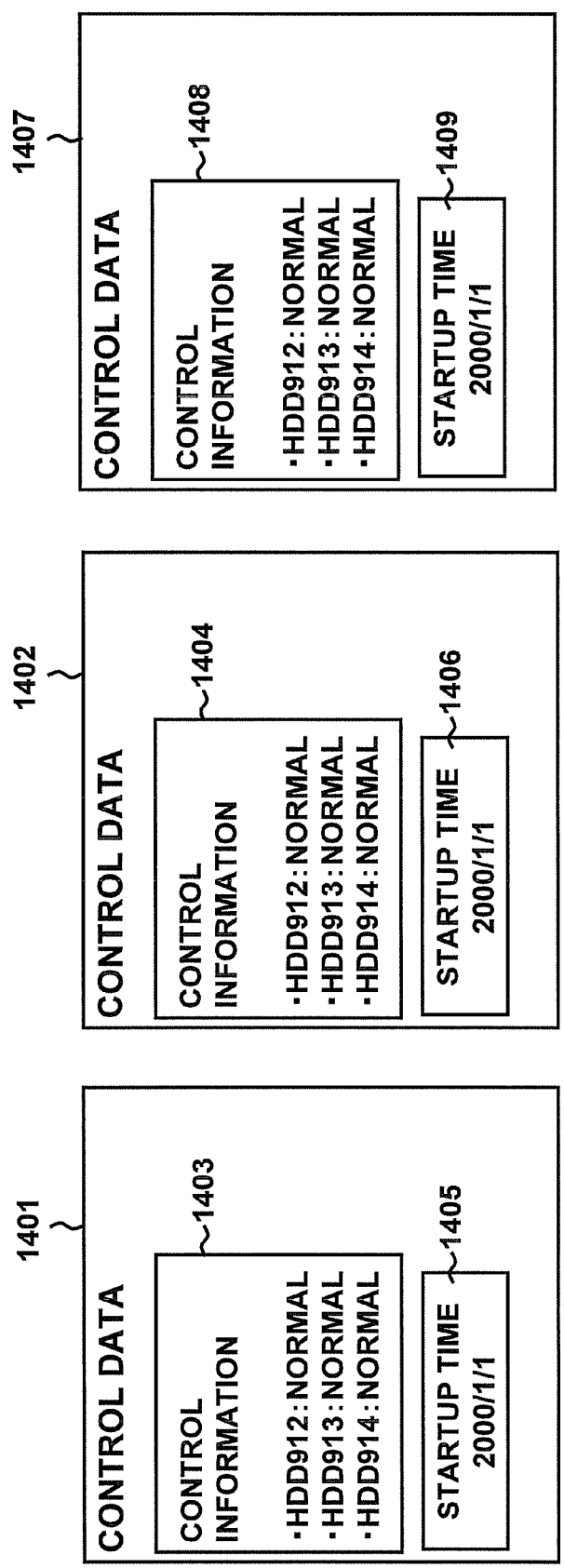

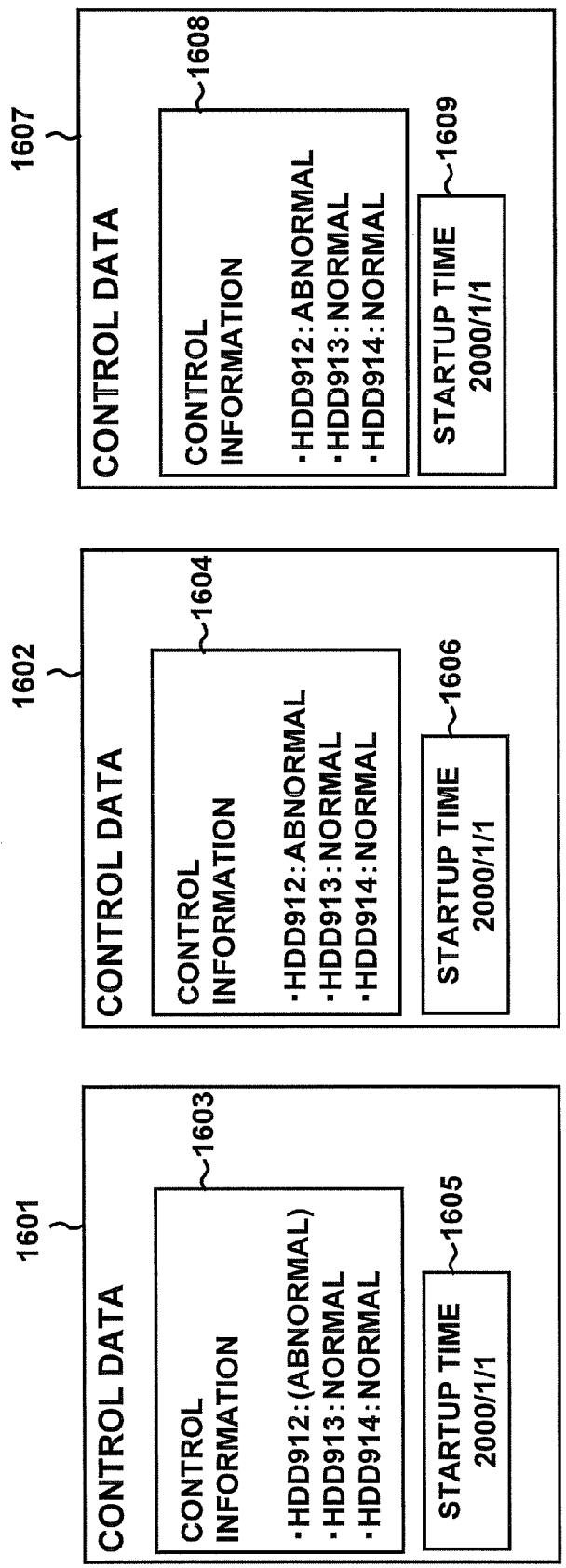

STORAGE DEVICE AND RECOVERY METHOD

CROSS-REFERENCE TO RELATED APPLICATION

This application is based upon and claims the benefit of priority and is a continuation of the prior International Application No. PCT/JP2007/051195, filed on Jan. 25, 2007, the entire contents of which are incorporated herein by reference.

FIELD

A certain aspect of the embodiments discussed herein is related to a storage device that restores data.

BACKGROUND

Redundant storage devices such as a RAID device composed of plural disks disconnect a disk involving any failure in the event of disk failure. Here, the disk failure refers to, for example, thermal off-track, contamination, noise, a contact failure, etc.

Such a storage device disconnects a disk involving any failure and updates recorded data using normal disks only. If a failure occurs in another disk, the storage device additionally disconnects the disk involving a failure. Such a state that a failure occurs in plural disks and redundancy is lost and in addition, a disk is further disconnected is called a multi-dead state. Here, the disk disconnected due to the failure occurrence can temporarily operate a normal disk as a result of hard reset or power restore. This is because a disk is disconnected due to temporal noise contamination, thermal off-track, and a small foreign material (contamination) on a medium in the disk in many cases, and often recovers as a result of restoring a power after power-off, hard reset, or the like. To that end, the disconnected disk is hard-reset or a power is restored for the disconnected disk in order to restore the storage device from the multi-dead state to a status just before the elimination of redundancy. Then, the disconnected disk is driven and set to the status just before the elimination of redundancy. However, if states of plural disks just before elimination of redundancy cannot be securely determined, in the case of rebooting the storage device, a system might fail to start or erroneously operate due to erroneous write to any disk. To elaborate, the following problem occurs; if disks cannot be prioritized and reconnected upon recovery of plural disconnected disks, states of the disks just before elimination of redundancy cannot be securely determined.

Further, a disk array control device capable of restoring a disk device is disclosed in the Japanese Laid-open Patent Publication No. 10-289065

SUMMARY

According to an aspect of an embodiment, an storage device including a plurality of storage units for storing data dispersively among the storage units, the storage device being capable of operating, when one of the storage units is inoperative on account of a failure therein, with the rest of the storage units, including: a processor for controlling boot-up of the storage units; and a memory for storing operation history indicative of the sequence of any failure causing any of the storage units to become inoperative, the processor controlling reboot-up of the storage units, when a plurality of the storage units becomes inoperative on account of a plurality of failures, in accordance with process including: determining the order of the reboot up of the storage units that is reversal of the sequence of the failures causing the storage units to become inoperative in reference to the operation history in the memory; rebooting the inoperative storage units successively in accordance with the determined order.

The object and advantages of the invention will be realized and attained by means of the elements and combinations particularly pointed out in the claims.

It is to be understood that both the forgoing general description and the following detailed description are exemplary and explanatory and are not respective of the invention, as claimed.

BRIEF DESCRIPTION OF THE DRAWINGS

FIGS. 6A and 6B show data 601 and data 602 stored in RAID control areas 116 and 119 according to an embodiment of the present invention.

FIG. 11 is a flowchart of record recovery according to an embodiment of the present invention.

FIGS. 14A, 14B and 14C show control data 1401 and data 1402 stored in RAID control areas 917 and 920 according to an embodiment of the present invention.

FIGS. 15A, 15B and 15C show control data 1601 and data 1602 stored in RAID control areas 917 and 920 according to an embodiment of the present invention.

DESCRIPTION OF EMBODIMENTS

First Embodiment

This embodiment describes the case where a storage device 100 has mirror configuration. The mirror configuration refers to such configuration that two or more recording media record the same data.

[System Configuration]

Figure 1:
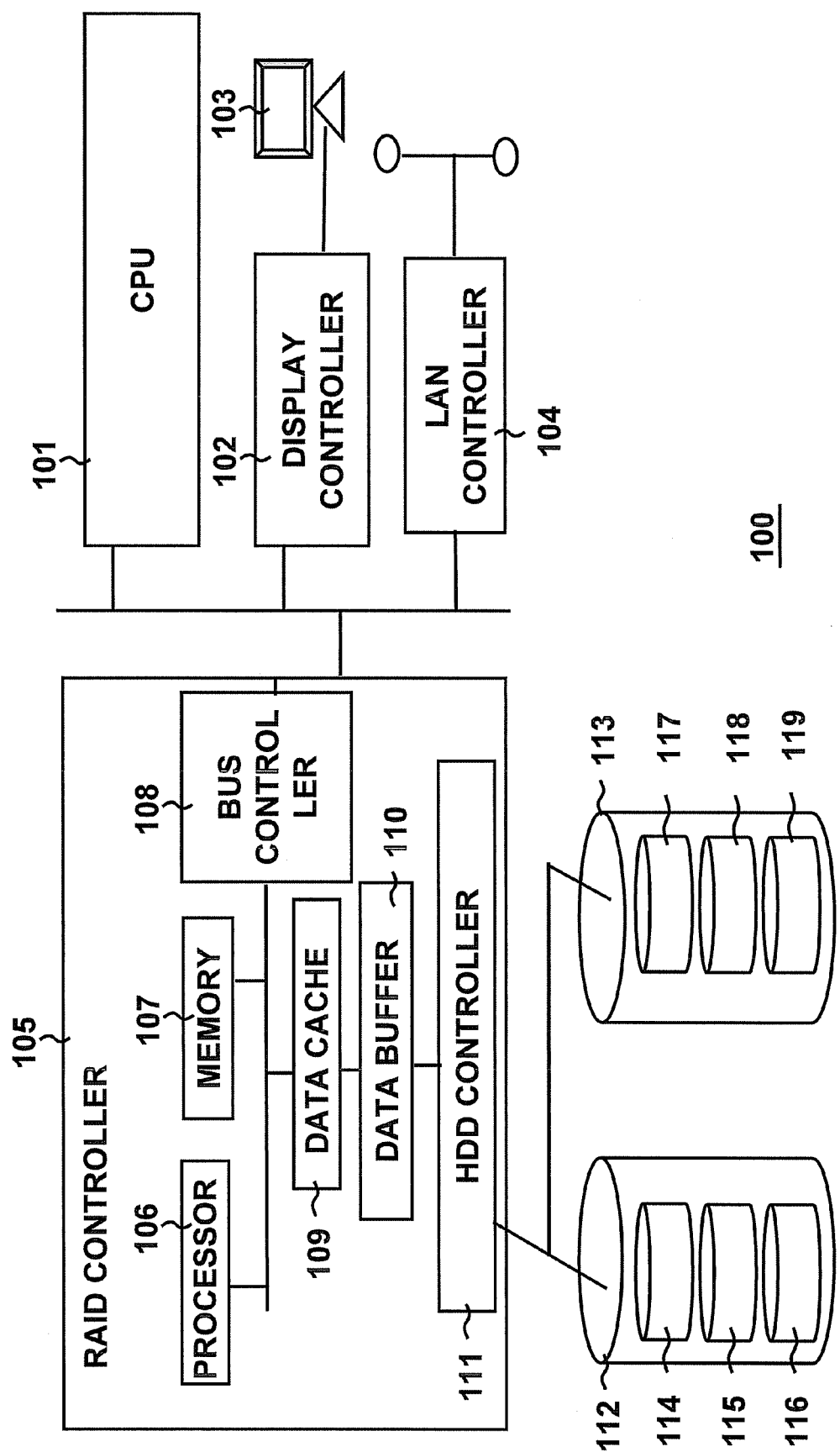
FIG. 1 is a hard block diagram of a RAID device 100 according to an embodiment of the present invention.

FIG. 1 is a hard block diagram of the storage device 100 of this embodiment. The storage device 100 is, for example, a RAID (Redundant Arrays of Inexpensive Disks) device or other such device. In this embodiment, the storage device 100 is hereinafter referred to as RAID device 100.

[Raid Device 100]

The RAID device 100 includes a CPU (Central Processing Unit) module 101, a display controller (Display Controller) 102, a display 103, a LAN controller (LAN Controller) 104, a RAID controller (RAID Controller) 105, and hard disks (HDDs) 112 and 113. The CPU module 101 controls the whole RAID device 100, and performs control over the display controller 102, the LAN controller 104, and the RAID controller 105. Further, the CPU module 101 includes a recording medium such as a memory, and opens an OS of the RAID device 100 on the memory to run the OS. The display controller 102 performs display control on the display 103. The display 103 controls communications on a network connected to the RAID device 100. The RAID device 100 loads desired data from an external network outside of the RAID device 100 through the LAN controller 104.

[RAID Controller 105]

The RAID controller 105 includes a processor 106, a memory 107, a bus controller 108, a data cache data cache 109, a data buffer 110, and an HDD controller 111. The processor 106 controls data write/read to/from the hard disk 112 or the hard disk 113 through the HDD controller 111. The processor 106 executes a program stored in the memory 107. The bus controller 108 controls data exchange between the RAID controller 105 and the CPU module 101. Further, the processor 106 performs control connection with the hard disks 112 and 113 through the HDD controller 111. A state of the RAID controller 105 being connected with the hard disks 112 and 113 is referred to as "on-line", and a state of the RAID controller 105 being disconnected from the hard disks 112 and 113 is referred to as "off-line". Here, the processor 106 can read control information from the hard disks 112 and 113 through the HDD controller 111 regardless of whether the device operates off-line or on-line. The data cache 109 supports accesses to the hard disks 112 and 113, and temporarily stores data that have accessed the hard disks 112 and 113, and the stored information is processed at a high speed without requiring direct accesses to the disks. Further, the data buffer 111 is a storage unit for temporarily storing data to be written to the hard disks 112 and 113. The data buffer 110 is provided because a certain amount of data should be written to the hard disks 112 and 113 in a given period of time. In other words, the data cache 109 and the data buffer 110 store data, instructed to write by the CPU module 101 or the processor 106, ahead of the hard disks 112 and 113. Then, if a data amount exceeds a predetermined capacity, the HDD controller 111 reads data from the data buffer 110 through the data cache 109 and stores the data on the hard disks 112 and 113. Owing to the provision of the data cache 109 and the data buffer 110, the processor 106 can handle data transfer.

The hard disk 112 includes a system area 114, a data area 115, and a RAID control area 116. The hard disk 113 includes a system area 117, a data area 118, and a RAID control area 119. The system area 114, the data area 115, and the RAID control area 116 are obtained by dividing the hard disk 112. Likewise, the system area 117, the data area 118, and the RAID control area 119 are obtained by dividing the hard disk 113. Capacities of the system areas 114 and 117, the data areas 115 and 118, and the RAID control areas 116 and 119 are variable within the range of data capacity of the hard disks 112 and 113.

The system areas 114 and 117 store an OS (Operation System) executed on the RAID device 100, an application program, and the like. The data areas 115 and 118 store data of the RAID device 100. The RAID control areas 116 and 119 store control information for the RAID device 100. Here, the data refers to user's personal information etc., not a program for controlling the data buffer 110. The control information refers to information about whether the hard disks 112 and 113 are normal. This information is updated by the processor 106 through the HDD controller 111.

Figure 4B:
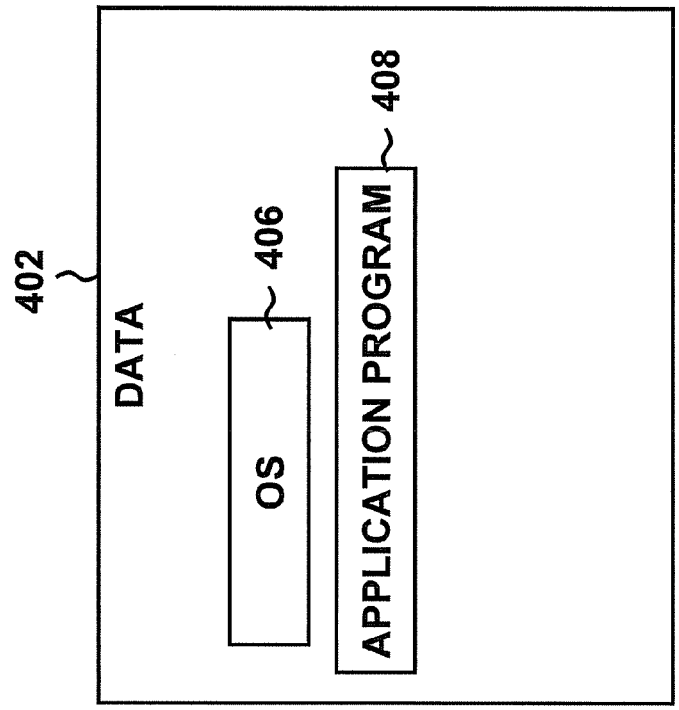
FIGS. 4A and 4B show data 401 and data 402 stored in system areas 114 and 117 according to an embodiment of the present invention.
Figure 4A:
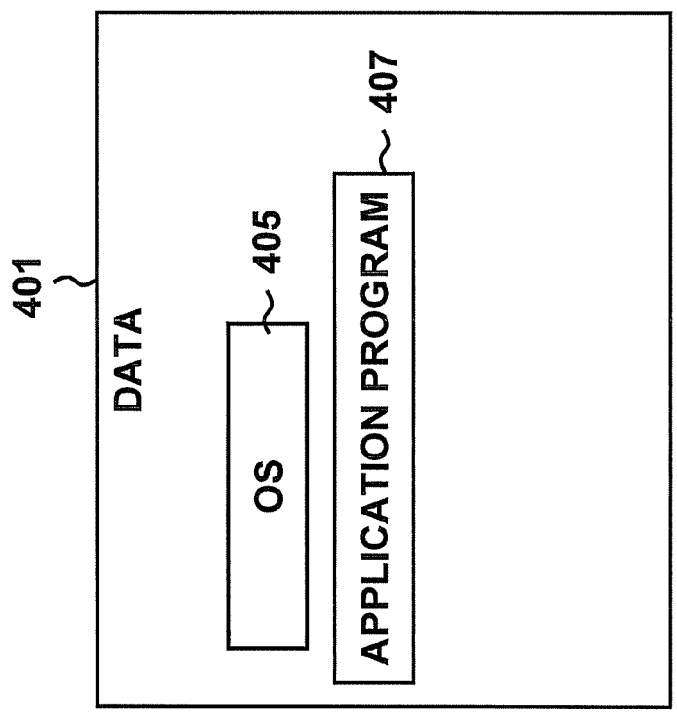
Figure 5B:
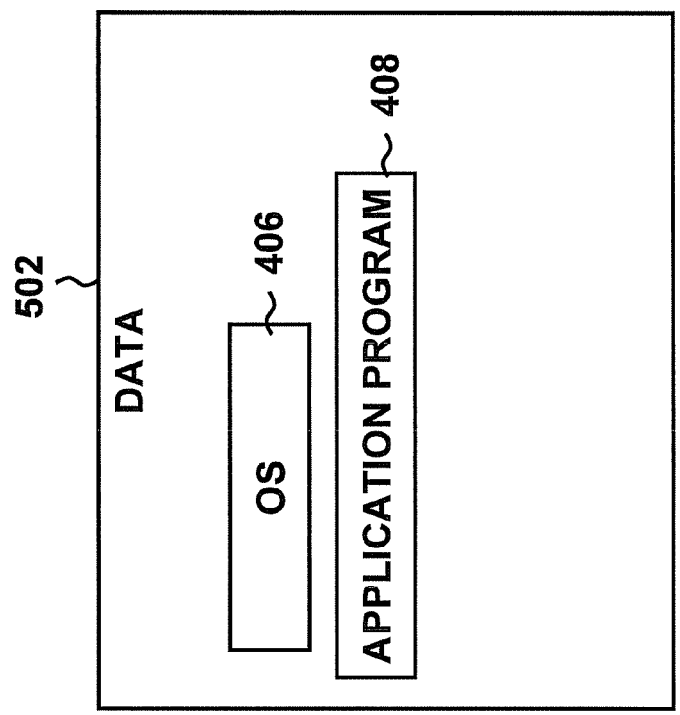
FIGS. 5A and 5B show data 501 and data 502 stored in system areas 114 and 117 according to an embodiment of the present invention.
Figure 5A:
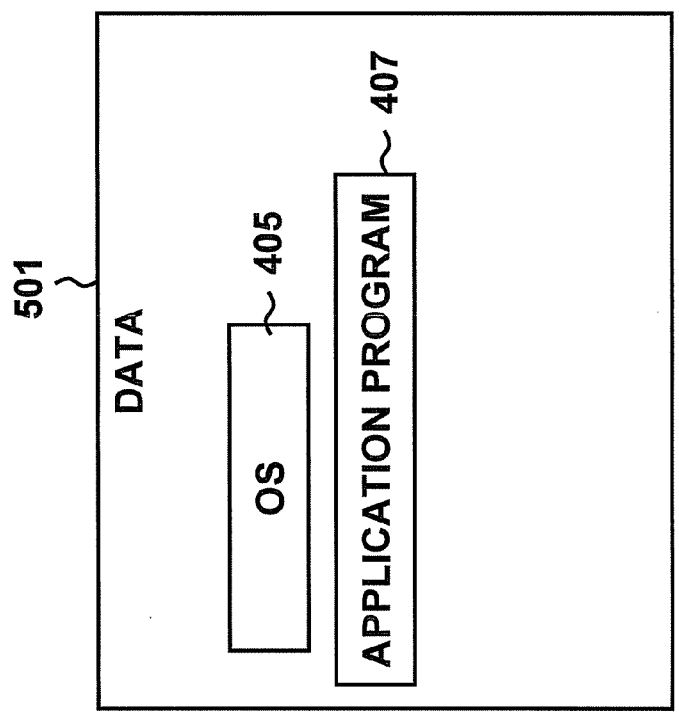

FIG. 4A shows data 401 stored in the system area 114 of this embodiment. The data 401 includes an OS 404 and an application program 406 to be executed on the RAID device 100. Likewise, data stored in the system area 117 of this embodiment is shown in FIG. 4B. This data 402 includes an OS 405 and an application program 407 to be executed on the RAID device 100.

Figure 17:
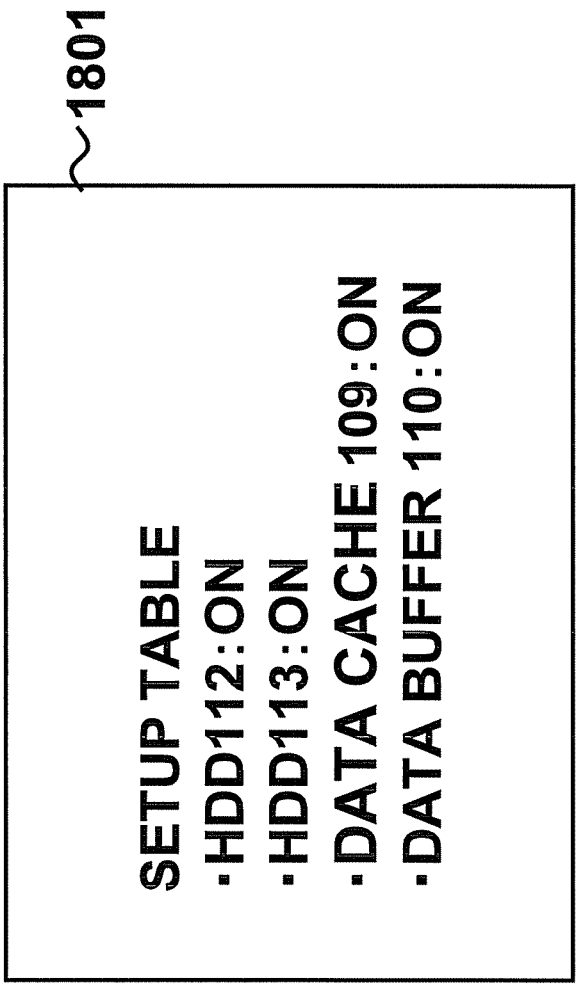
FIG. 17 shows a setup table 1801 stored in a memory 107 according to an embodiment of the present invention.

Further, a setup table 1801 in FIG. 17 shows on/off states of write flags indicating whether to write/read data to/from the hard disks 112 and 113, the data cache 109, and the data buffer 110. All the write flags in a setup table 403 are initially turned on. The setup table 1801 is stored in the memory 107.

In this embodiment, the RAID device 100 has the mirror configuration. Thus, the OS 404 constituting the data 401 is the same as the OS 405 constituting the data 402, and the application program 406 constituting the data 401 is the same as the application program 407 constituting the data 407.

In this embodiment, a user sets on/off states of flags that enable/disable write to the data cache 109, the data buffer 110, and the hard disks 112 and 113 upon BIOS (Basic Input/Output System) setup.

Figure 18:
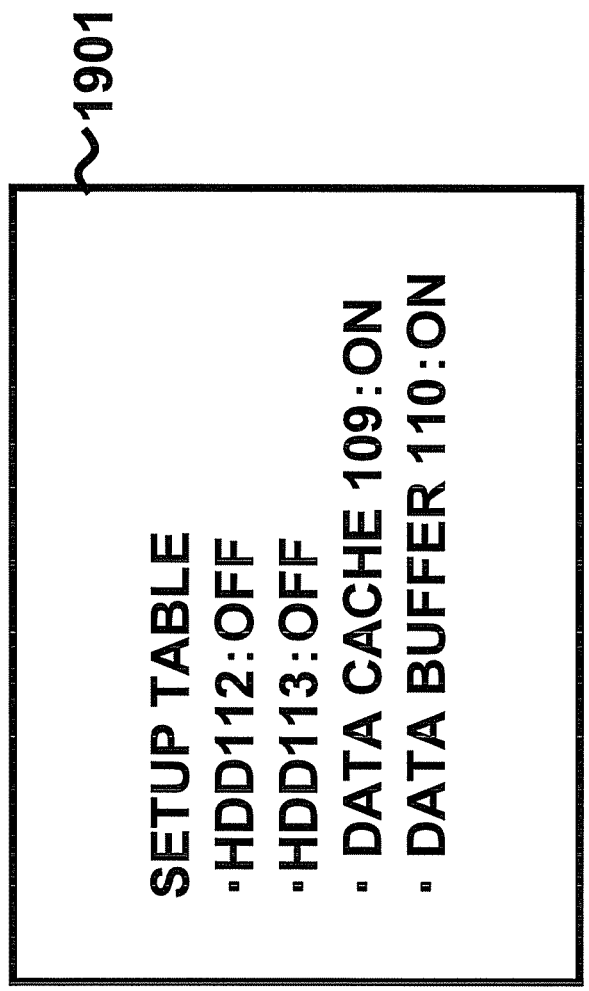
FIG. 18 shows a setup table 1901 stored in a memory 107 according to an embodiment of the present invention.

Further, in the case of disabling write to the hard disks 112 and 113, the processor 106 can directly read data from the data cache 109 or the data buffer 110. The processor 106 updates the setup table 1801 to a setup table 1901 shown in FIG. 18. The write flag indicating whether to write data to the hard disks 112 and 113 is set off. Then, the write flag indicating whether to write data to the data cache 109 is kept on, not changed (set to 1; set the write flag), and the write flag that allows write to the data buffer 110 is also kept on.

FIG. 6A shows data 601 stored in the RAID control area 116. The data 601 includes control information 603 and system startup time. The control information 603 refers to control information for the case where no failure occurs in the hard disks 112 and 113 and indicates that the hard disks 112 and 113 normally operate. Likewise, data 602 stored in the RAID control area 119 is stored in FIG. 6B. The data 602 includes control information 604 and system startup time. The control information 604 refers to control information for the case where no failure occurs in the hard disks 112 and 113 and indicates that the hard disks 112 and 113 normally operate.

Figure 7A:
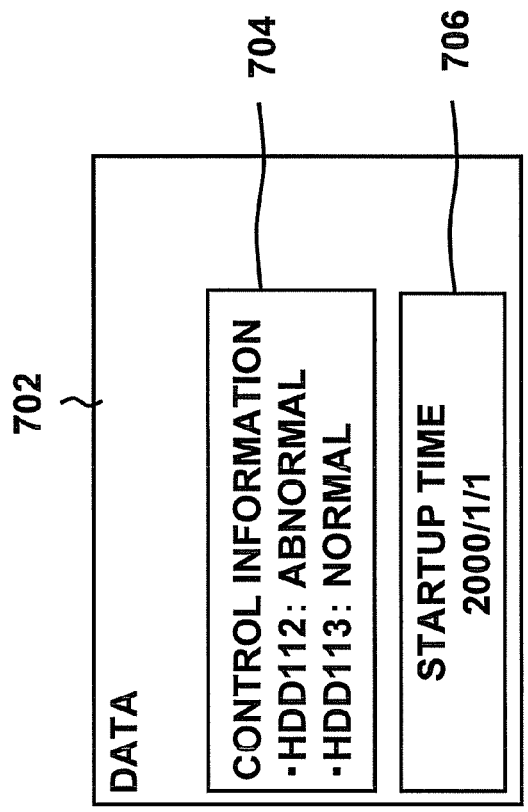
FIGS. 7A and 7B show data 701 and data 702 stored in RAID control areas 116 and 119 according to an embodiment of the present invention.
Figure 7B:
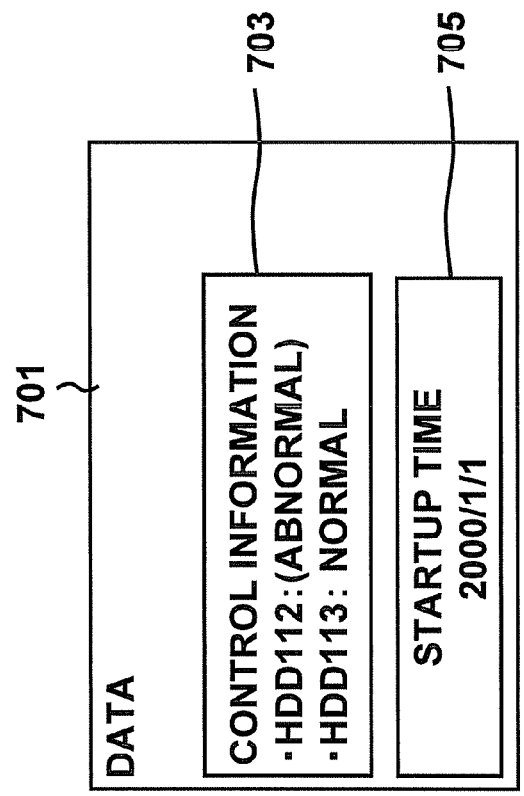

If any failure occurs in the hard disk 112, the HDD controller 111 updates the control information 603 to control information 703 as shown in FIG. 7A. The control information 603 is stored in the RAID control area 116 and thus can be updated or not updated following the failure according to circumstances. In the control information 703 shown in FIG. 7A, an operation status of the hard disk 112 specified as "(abnormal)" means that an operation status of the hard disk 112 is set to "abnormal" if the HDD controller 111 can update the control information 603. Thus, in the case where the HDD controller 111 cannot update the control information 703, an operation status of the hard disk 112 is kept "normal" (similar to the control information 603). The HDD controller 111 updates the control information 604 stored in the RAID control area 119 to control information 704 shown in FIG. 7B. The HDD controller 111 updates an operation status of the hard disk 112 to "abnormal" and keeps an operation status of the hard disk 112 as "normal".

Figure 8B:
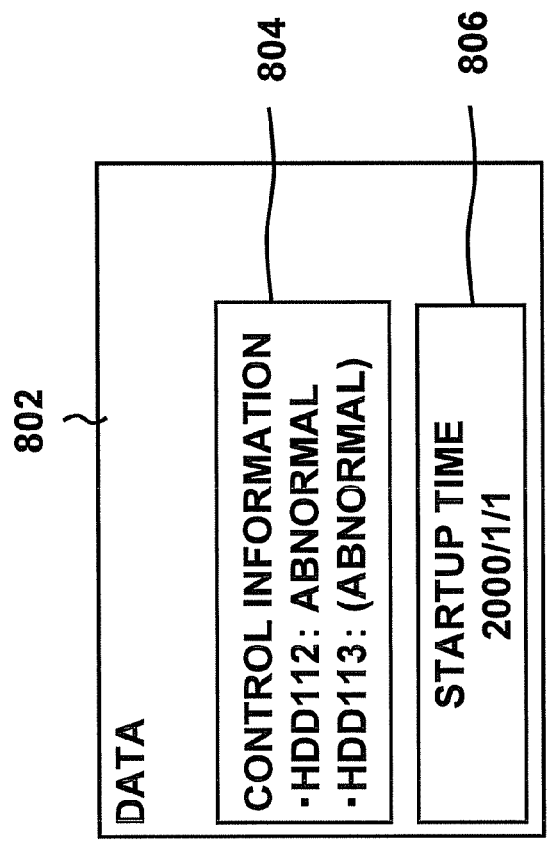
FIGS. 8A and 8B show data 801 and data 802 stored in RAID control areas 116 and 119 according to an embodiment of the present invention.
Figure 8A:
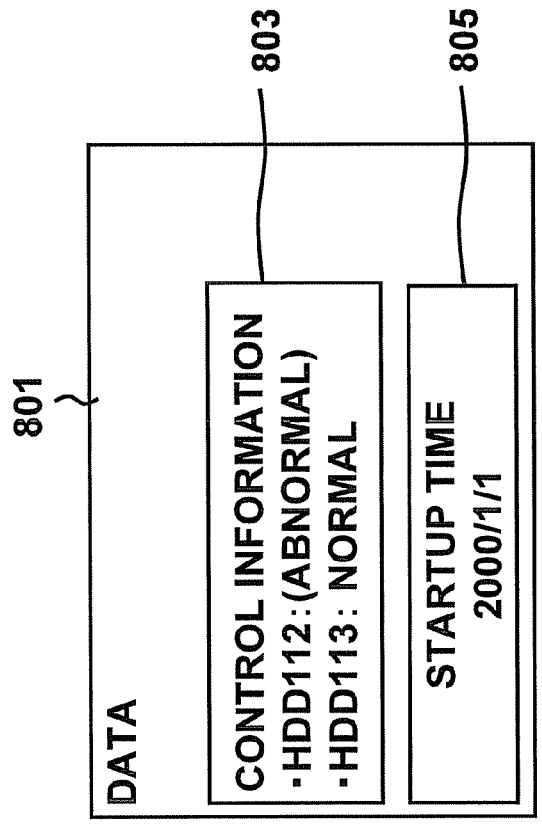

Further, if any failure occurs in the hard disk 113, the HDD controller 111 updates the control information 703 and 704 to control information 803 and 804 shown in FIGS. 8A and 8B. Operation statues of the hard disks 112 and 113 specified in the control information 803 in FIG. 8A are "(abnormal)". This means that if the HDD controller 111 can update the control information 703, operation statuses of the hard disks 112 and 113 are set to "abnormal". Thus, if the HDD controller 111 cannot update the control information 703, operation statuses of the hard disks 112 and 113 are kept "normal" (similar to the control information 703). An operation status of the hard disk 112 specified in the control information 803 in FIG. 8B is "abnormal", and an operation status of the hard disk 113 is "(abnormal)".

The control information 603, 604, 703, 704, 803, and 804 indicate whether the hard disks 112 and 113 normally operate. The HDD controller 111 updates the control information as needed.

Moreover, the HDD controller 111 has a function of detecting an abnormality in the hard disks 112 and 113. To describe a mechanism for detecting an abnormality in detail, for example, a diagnostic command is sent to the hard disks 112 and 113 to monitor whether a response signal is normally sent back from the hard disks 112 and 113 in response thereto within a predetermined period. Then, if the HDD controller 111 has not received a normal response signal within a predetermined period, the hard disks 112 and 113 are determined to cause an error. If the HDD controller 111 receives a normal response signal within a predetermined period, the hard disks 112 and 113 are determined not to cause an error. Further, it is monitored whether data is normally written or read. Then, if data is not normally written or read, it is determined that any error occurs.

Figure 2:
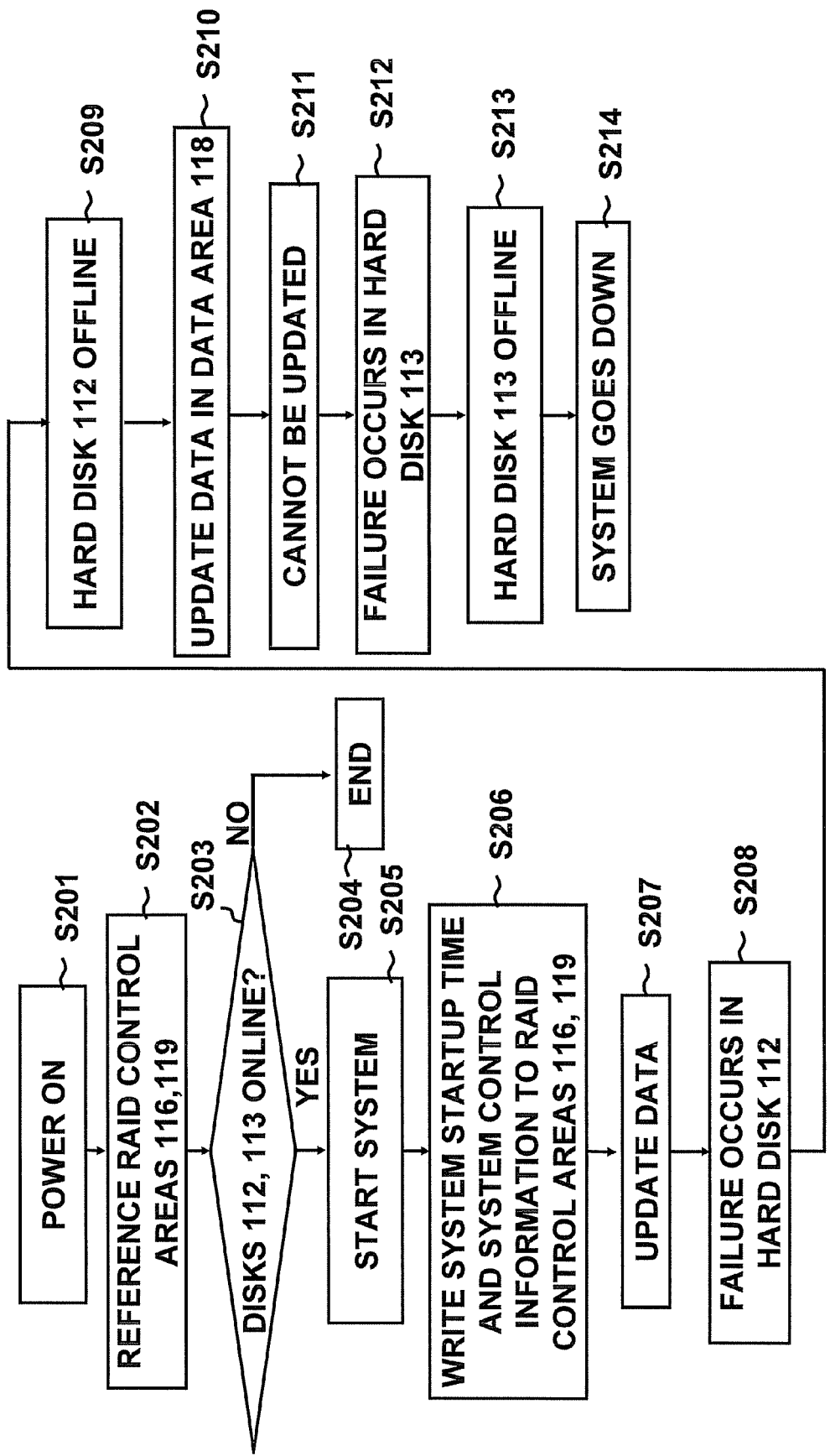
FIG. 2 is a flowchart of recording processing according to an embodiment of the present invention.

FIG. 2 is a flowchart of data recording processing of this embodiment. This embodiment describes the case in which the hard disk 112 causes a failure and is thus taken offline, after which the hard disk 113 causes a failure and is thus taken offline, thereby making the RAID device 100 multi-dead. As for the order in which the hard disks 112 and 113 are taken offline, the hard disk 112 may be taken offline due to an occurrence of any failure after the hard disk 113 was taken offline due to an occurrence of any failure.

In this embodiment, the RAID device 100 has the mirror configuration. Therefore, the hard disks 112 and 113 store the same data. In other words, in the RAID device 100, the hard disks 112 and 113 constitute redundant configuration.

First, the RAID device 100 is powered on (step S201). The processor 106 references control information stored in the RAID control areas 116 and 119 (step S202). The processor 106 determines whether the disks 112 and 113 are normal based on the control information (step S203).

If the processor 106 determines that the hard disks 112 and 113 are not both offline, the RAID device 100 terminates the data recording processing (step S204). If the processor 106 determines that either the hard disk 112 or the hard disk 113 is offline, the CPU module 101 reads an OS from the system area 114 in the hard disk 112 or the system area 117 in the hard disk 113 to the memory 107 and starts the system (step S205). Then, the HDD controller 111 writes the system startup time and system control information to the RAID control areas 116 and 119 (step S206). The RAID device 100 records data input from the outside of the RAID device 100 to the data areas 115 and 118 to update data (step S207).

After that, a failure occurs in the hard disk 112 (step S208). The processor 106 takes the hard disk 112 offline (step S209). Then, the RAID device 100 records data input from the outside of the RAID device 100 to the data area 118 to update data (step S210). Since the hard disk 112 is offline, data on the data area 115 cannot be updated (step S211).

A failure occurs in the hard disk 113 (step S212). The HDD controller 111 takes the hard disk 113 offline (step S213). Since the hard disks 112 and 113 are offline, the system of the RAID device 100 goes down (step S214).

Figure 3:
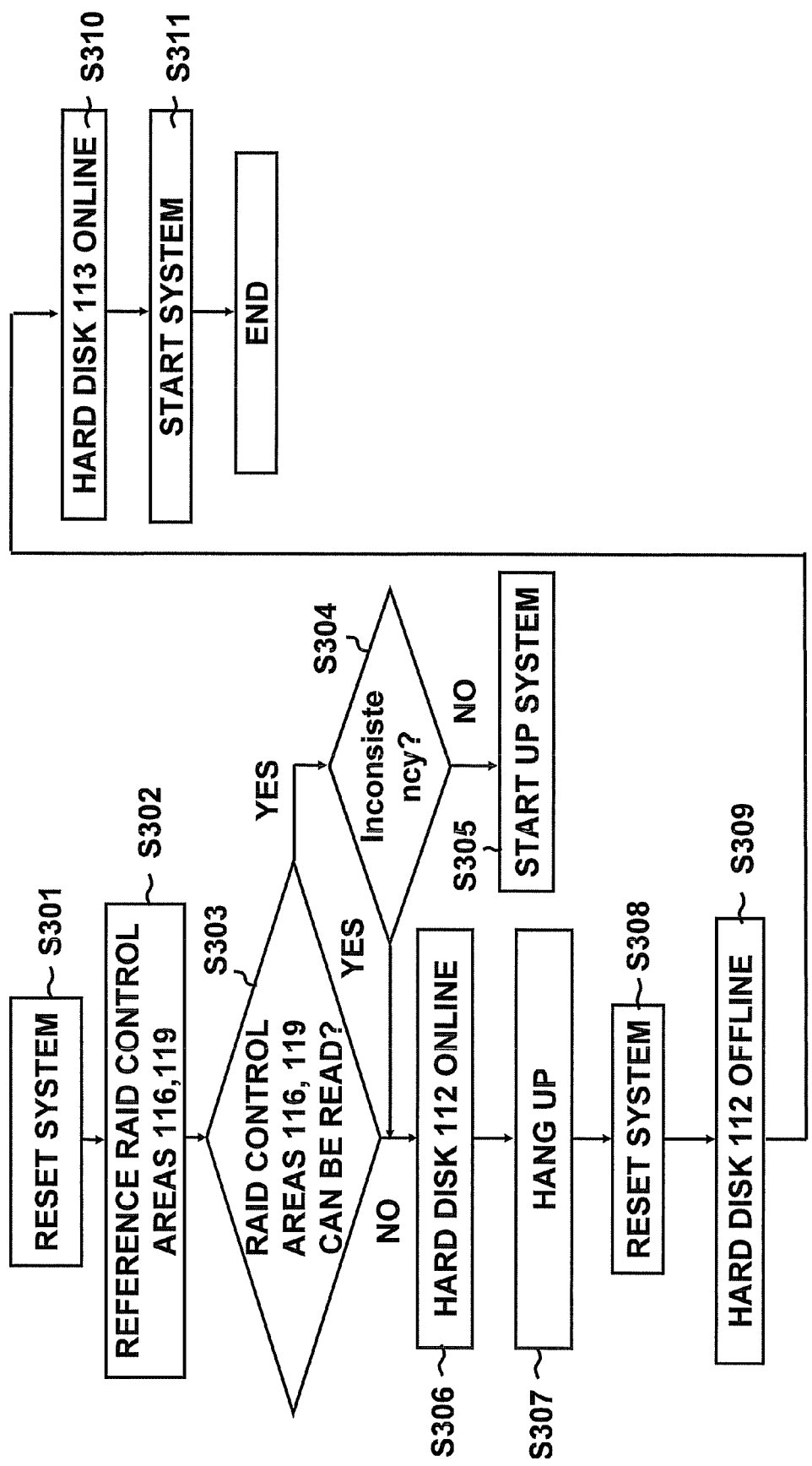
FIG. 3 is a flowchart of recording processing according to an embodiment of the present invention.

FIG. 3 is a flowchart of data record recovery in this embodiment. If both of the hard disks 112 and 113 become offline, and the system goes down in the RAID device 100, a user or the CPU module 101 resets the system (step S301). Then, the processor 106 tries to reference control information stored in the RAID control areas 116 and 119 (step S302). The processor 106 determines whether control information in the RAID control areas 116 and 119 can be read (step S303).

If the control information in the RAID control areas 116 and 119 can be read, the processor 106 references the control information in the RAID control areas 116 and 119.

Then, the processor 106 determines whether such an inconsistency that the RAID control areas 116 and 119 have recorded "abnormal" in each other's hard disk statuses in the control information (step S304).

If it is determined that the control information in the RAID control areas 116 and 119 have no inconsistency, the processor 106 compares the control information stored in the RAID control area 116 with the control information stored in the RAID control area 119 to analyze a status just after elimination of redundancy.

The processor 106 determines that the hard disk 113 is disconnected after the disconnection of the hard disk 112 from the RAID device 100. Then, the processor 106 makes only the hard disk 113 online to shift a current state to the status just after the elimination of redundancy, after which the CPU module 101 starts up the system (step S305).

In the control information in the RAID control area 116, a log of the access time when the HDD controller 111 accesses the hard disk 112 is recorded. Likewise, in the control information in the RAID control area 119, a log of the access time when the HDD controller 111 accesses the hard disk 113 is recorded. The processor 106 compares the time of access to the hard disk 112 with the time of access to the hard disk 113 to determine the order in which the hard disks 112 and 113 are disconnected to thereby analyze the status just after elimination of redundancy. Further, the processor 106 can reference startup time recorded in the system areas 114 and 117 as well, and may determine the order in which the hard disks 112 and 113 are disconnected to thereby analyze the status just after elimination of redundancy.

If the control information in the RAID control areas 116 and 119 cannot be read (NO in step S303) or the status just after elimination of redundancy cannot be analyzed because the RAID control areas 116 and 119 have an inconsistency that "abnormal" is recorded in each other's hard disk statuses in the control information (YES in step S304), the processor 106 checks whether the memory 107 stores control information representing the status just after elimination of redundancy. The processor 106 sets the HDD controller 111 to disable write to the hard disk 112. Further, the processor 106 determines whether the memory 107 stores information indicating that the hard disk becomes online to confirm that the information is not stored and then, stores information that the disk 112 becomes online in the memory 107 to turn the hard disk 112 online (step S306). As a result, even if the hard disk 112 becomes online, the HDD controller 111 writes no data to the hard disk 112. The HDD controller 111 stores all data written to the hard disk 112 (inclusive of the system startup time and startup status, etc.) on the data cache 109. The HDD controller 111 may record the system startup time and startup status on the data buffer 110. The startup status indicates whether the hard disk 112 is online or offline.

The CPU module 101 determines that an OS panics or hangs to hinder normal startup of the system (step S307). A user of the CPU module 101 resets the system (step S308). The processor 106 checks whether the memory 107 stores control information representing the status just after elimination of redundancy. The processor 106 sets the HDD controller 111 to disable write to the hard disk 112. Further, the processor 106 determines whether the memory 107 stores information indicating that the hard disk 112 became online at the last minute to confirm that the hard disk 112 and then, the processor 106 takes the hard disk 112 offline (step S309). Then, the processor 106 turns the hard disk 113 online, and stores information to the effect that the hard disk 112 becomes offline and the hard disk 113 becomes online (step S310).

When an OS is activated normally, the CPU module 101 notifies the processor 106 that the system operates normally and then, sets ON all the write flags in the setup table to reboot the OS. The processor 106 references information representing the status just after elimination of redundancy (information indicating that the hard disk 112 becomes offline and the hard disk 113 becomes online in the RAID device 100) in the memory 107.

Then, the processor 106 takes the hard disk 112 offline and sets the hard disk 113 online, after which normal startup is executed.

After that, the hard disk 112 is replaced by a new hard disk because of a high risk of failure and rebuilt using the hard disk 113. After the completion of rebuilding, the hard disk 113 is replaced by a new disk to restore the mirror configuration as default settings to thereby completely restore the system.

In the case where a bus system involves an abnormality in daisy-chained hard disks, referencing logs that are recorded on a nonvolatile memory etc. by the RAID device is not enough to prevent such a situation that plural hard disks are disconnected during intervals at which a log is recorded. As understood from this, the order in which hard disks are disconnected cannot be determined, and the RAID device cannot be properly restored. According to the present invention, even if a hard disk is set online, the disk can be run without writing startup time or the like. Thus, the order of startup can be determined through determination as to whether the disk normally runs.

Second Embodiment

This embodiment describes RAID 3 configuration using an example where a storage device 900 divides a data area into plural hard disks (referred to as striping) to achieve redundant configuration using a fixed parity disk. The storage device 900 is not limited to the RAID 3 configuration but might record parity on plural hard disks in a distributive manner.

Figure 9:
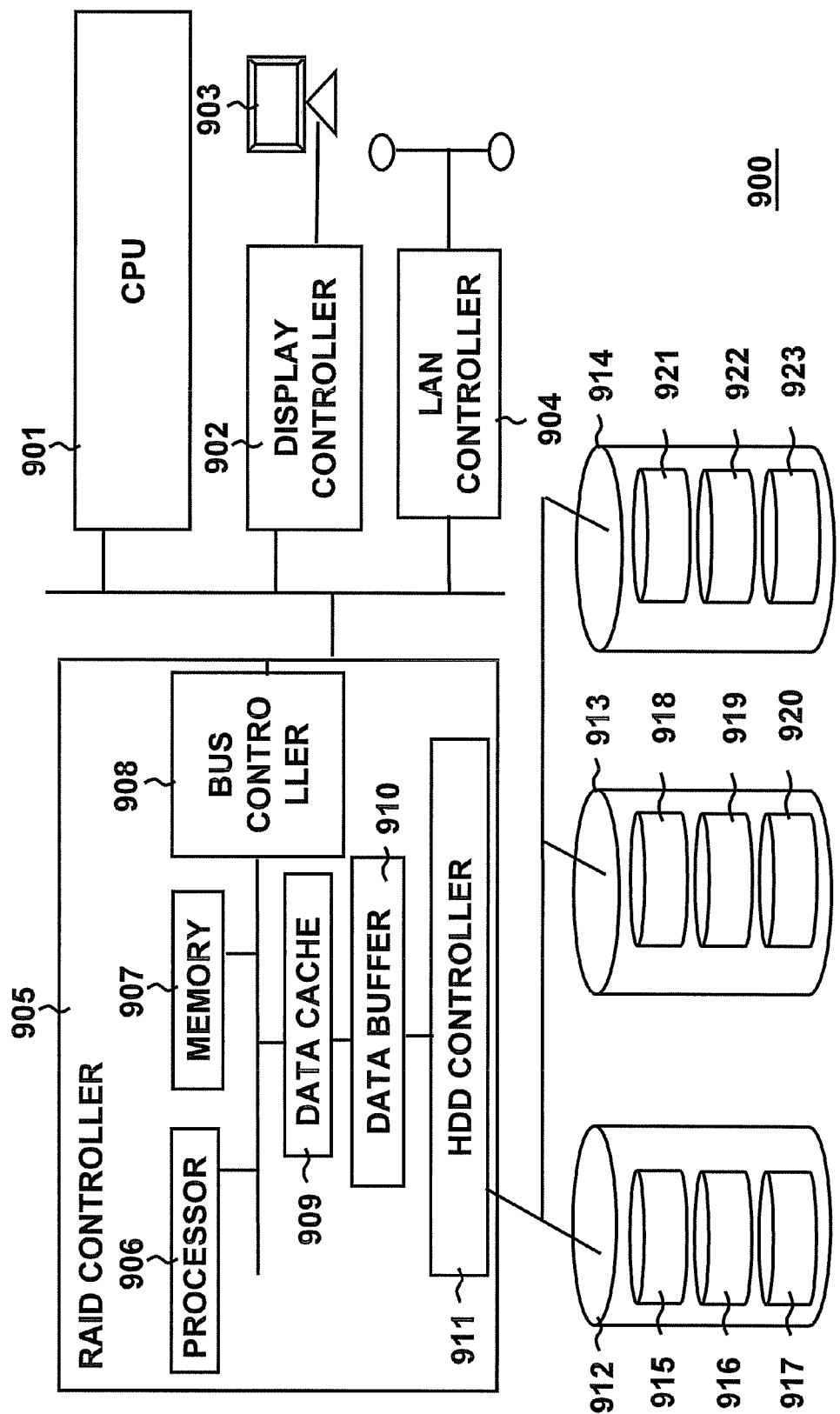
FIG. 9 is a hard block diagram of a RAID device 900 according to an embodiment of the present invention.

FIG. 9 is a hard block diagram of the RAID device 900 of this embodiment.

[RAID Device 900]

The RAID device 900 includes a CPU (Central Processing Unit) module 901, a display controller (Display Controller) 902, a display 903, a LAN controller (LAN Controller) 904, a RAID controller (RAID Controller) 905, and hard disks (HDDs) 912, 913, and 914. The CPU module 901 controls the whole RAID device 900, and performs control over the display controller 902, the LAN controller 904, and the RAID controller 905. Further, the CPU module 901 includes a recording medium such as a memory, and opens an OS of the RAID device 900 on the memory to run the OS. The display controller 902 performs display control on the display 903. The display 903 controls communications on a network connected to the RAID device 900. The RAID device 900 loads desired data from an external network outside of the RAID device 900 through the LAN controller 904.

[RAID Controller 905]

The RAID controller 105 includes a processor 906, a memory 907, a bus controller 908, a data cache data cache 909, a data buffer 910, and an HDD controller 911. The processor 906 controls data write/read to/from the hard disk 912 or the hard disk 913 through the HDD controller 911. The processor 906 executes a program stored in the memory 907. The bus controller 908 controls data exchange between the RAID controller 905 and the CPU module 901. Further, the processor 906 performs control connection with the hard disks 912, 913, and 914 through the HDD controller 911. A state of the RAID controller 105 being connected with the hard disks 912, 913, and 914 is referred to as "on-line", and a state of the RAID controller 105 being disconnected from the hard disks 912, 913, and 914 is referred to as "off-line". Here, the processor 906 can read control information from the hard disks 912 and 913 through the HDD controller 911 regardless of whether the device operates off-line or on-line. The data cache 909 supports accesses to the hard disks 912, 913, and 914, and temporarily stores data that have accessed the hard disks 912, 913, and 914, and the stored information is processed at a high speed without requiring direct accesses to the disks. Further, the data buffer 911 is a storage unit for temporarily storing data to be written to the hard disks 912, 913, and 914. The data buffer 910 is provided because a certain amount of data should be written to the hard disks 912, 913, and 914 in a given period of time. In other words, the data cache 909 and the data buffer 910 store data, instructed to write by the CPU module 901 or the processor 906, ahead of the hard disks 912, 913, and 914. Then, if a data amount exceeds a predetermined capacity, the HDD controller 911 reads data from the data buffer 910 through the data cache 909 and stores the data on the hard disks 912, 913, and 914. Owing to the provision of the data cache 109 and the data buffer 910, the RAID device 900 can handle data transfer.

The hard disk 912 includes a system area 915, a data area 916, and a RAID control area 917. The hard disk 913 includes a system area 918, a data area 919, and a RAID control area 920. The hard disk 914 includes a system area 921, a data area 922, and a RAID control area 923.

The system area 915, the data area 916, and the RAID control area 917 are obtained by dividing the hard disk 912. Likewise, the system area 918, the data area 919, and the RAID control area 920 are obtained by dividing the hard disk 913. The system area 921, the data area 922, and the RAID control area 923 are obtained by partitioning the hard disk 914. Capacities of the system areas 915, 918, and 921, the data areas 916, 919, and 921, and the RAID control areas 917m 920, and 923 are variable within the range of data capacity of the hard disks 912, 913, and 914.

The RAID 3 configuration is such that a hard disk storing parity information generated from data is added to a stripe array. With this configuration, if any failure occurs in a hard disk, the RAID 3 can reconfigure data based on parity information. In this embodiment, the striping array corresponds to the hard disks 912 and 913. The hard disk 914 stores parity information.

The system area 915 store stripe data 1201 such as an OS or application program executed on the RAID device 900. Likewise, the system area 918 store stripe data 1202 such as an OS or application program executed on the RAID device 900. The stripe data 1201 and 1202 are obtained by distributing data such as an OS or application program executed on the RAID device 900. A distribution ratio between the stripe data 1201 and 1202 can be set by a user. The system area 921 stores parity data 9211 obtained by performing exclusive OR between the stripe data 1201 and the stripe data 1202.

The data areas 916 and 919 store data of the RAID device 100 in a distributive manner, and store stripe data 9161 and 9191, respectively. The data area 921 stores parity data 9221 obtained by performing exclusive OR between the stripe data 9161 stored in the data area 916 and the stripe data 9191 stored in the data area 919. Here, the data refers to user's personal information etc., not a program for controlling the data buffer 110.

The RAID control areas 917, 920, and 923 store the control information of the RAID device 900 as control data 917, 920, and 923 independently of one another, not in a distributive manner. The control information refers to information about whether the hard disks 912, 913, and 914 are normal. This information is updated by the processor 906 through the HDD controller 911.

Figure 12B:
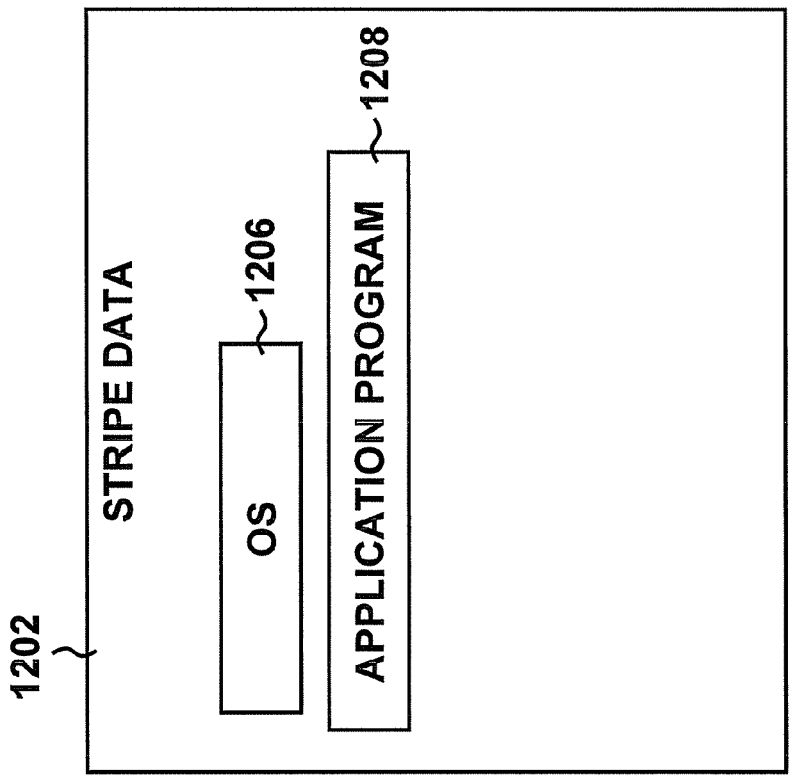
FIGS. 12A and 12B show stripe data 1201 and data 1202 stored in system areas 915 and 918 according to an embodiment of the present invention.
Figure 12A:
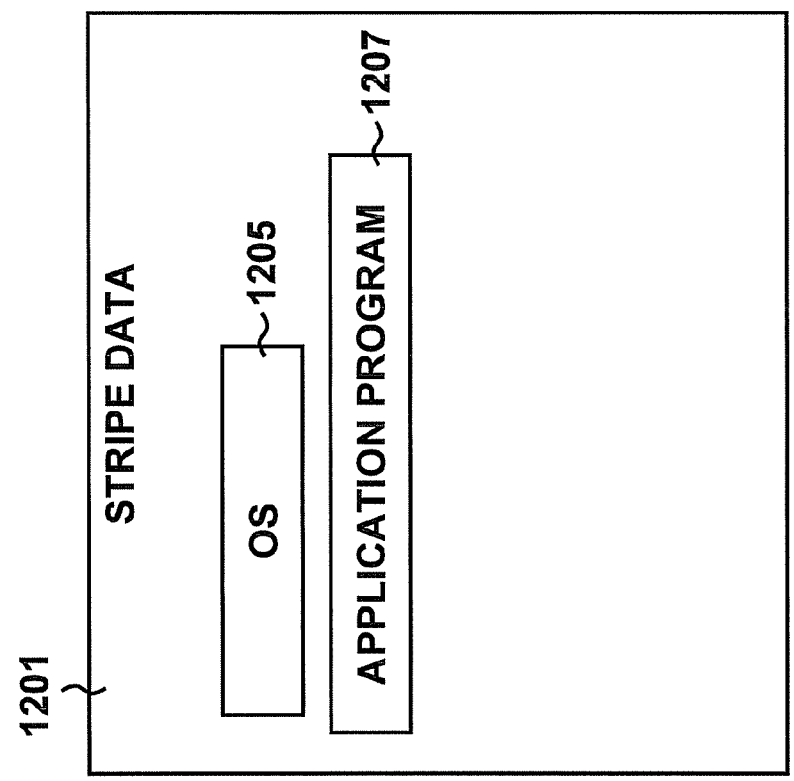
Figure 13:
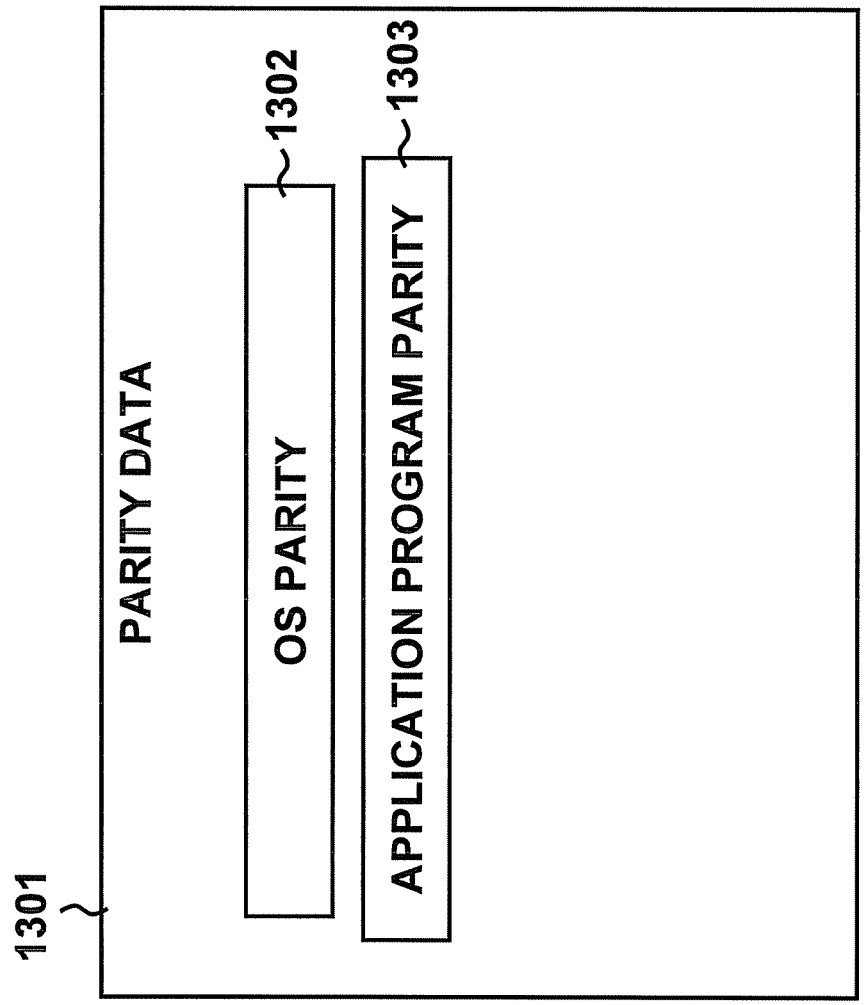
FIG. 13 shows parity data 1301 stored in system area 921 according to an embodiment of the present invention.

FIG. 12A shows the stripe data 1201 stored in the system area 915 of this embodiment. The data 1201 includes an OS 1205 to be executed on the RAID device 900. Since the stripe data 1201 is a distributed one of the data including an OS or application program executed on the RAID device 900, an OS 1205 and an application program 1207 are included in the OS, application program, and setup table. Likewise, stripe data 1202 stored in the system area 918 of this embodiment is shown in FIG. 12B. The stripe data 1202 includes an OS 1206 and an application program 1208 to be executed on the RAID device 900. The OS 1205 and the OS 1206 constitute the OS of the RAID device 900. Likewise, the application program 1207 and the application program 1208 constitute the application program of the RAID device 900. In this embodiment, the stripe data 1201 and 1202 both contain a part of the application program, but the distribution method is not limited thereto. For example, the following configuration may be employed; the OS of the RAID device 900 is stored in the system area 915 and the application program of the RAID device 900 is stored in the system area 918.

Figure 19:
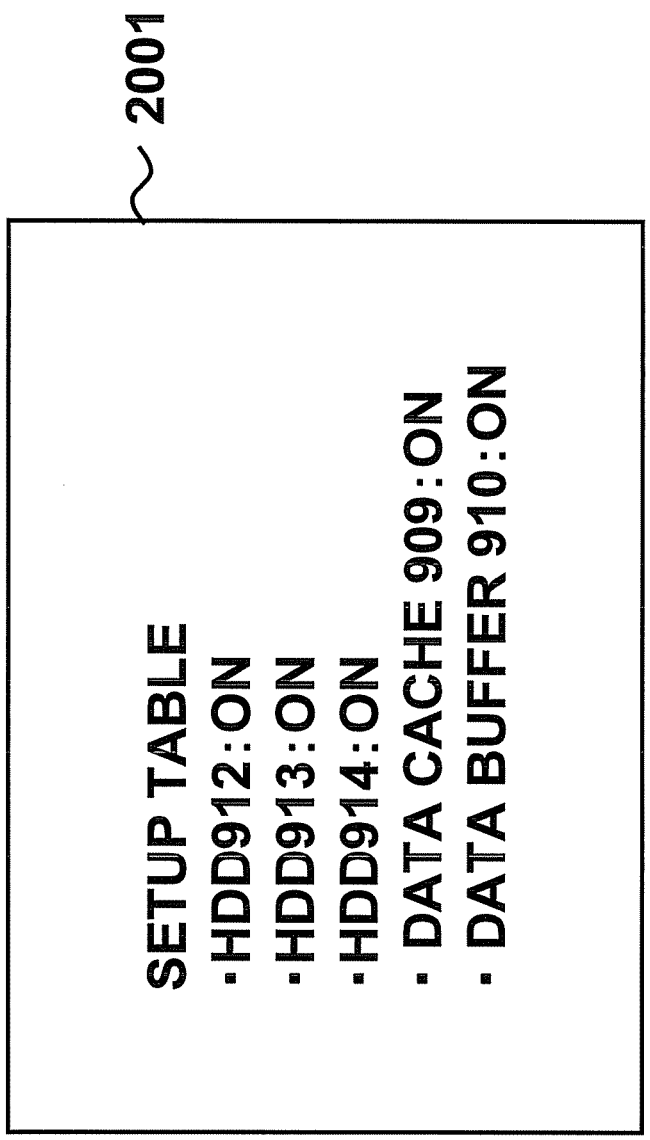
FIG. 19 shows a setup table 2001 stored in a memory 907 according to an embodiment of the present invention.

A setup table 2001 in FIG. 19 shows on/off states of write flags indicating whether to write/read data to/from the hard disk 912, the hard disk 913, the hard disk 914, the data cache 909, and the data buffer 110. All the write flags in the setup table 2001 are initially turned on. The setup table 2001 is stored in the memory 907.

In this embodiment, the RAID device 900 has parallel access array configuration. Thus, the OS 1205 and the OS 1206 are different data. Likewise, the application programs 1207 and 1208 are different data.

Further, the parity data 1301 is obtained by performing exclusive OR between the stripe data 1201 and the stripe data 1202. The processor 906 calculates the parity data 1301. Thus, if a failure occurs in the hard disk 912 and the stripe data 1201 cannot be read, for example, the parity data 1301 can reconstruct the stripe data 1201 based on the parity data 1301 and the stripe data 1202.

In this embodiment, a user sets on/off states of flags that enable/disable write to the data cache 109, the data buffer 110, and the hard disks 912, 913, and 914 upon BIOS (Basic Input/Output System) setup. If the write flags for the hard disks 912, 913, and 914 are turned off, the setup table 2001 is updated. The write flag that allows data write to the data cache 909 is kept on, not changed, and the write flag that allows data write to the data buffer 110 is also kept on. When a user or the CPU module 901 reboots the RAID device 900, it is possible to disable write of initial data to the hard disks 912, 913, and 914 along with startup by setting the write flags for the hard disks 912, 913, and 914 off. The initial data includes an OS startup time, startup state, or the like, and corresponds to setting data and log data accompanying the system startup.

FIG. 14A shows control data 1401 stored in the RAID control area 917. The control data 1401 includes control information 1403 and system startup time 1405. The control information 1403 refers to control information for the case where no failure occurs in the hard disks 912, 913, and 914, and indicates that the hard disks 912, 913, and 914 normally operate. Likewise, control data 1402 stored in the RAID control area 920 is stored in FIG. 14B. The control data 1402 includes control information 1404 and system startup time 1406. The control information 1404 refers to control information for the case where no failure occurs in the hard disks 912, 913, and 914 and indicates that the hard disks 912, 913, and 914 normally operate. Likewise, control data 1407 stored in the RAID control area 923 is stored in FIG. 14B. The control data 1407 includes control information 1408 and system startup time 1409. The control information 1404 refers to control information for the case where no failure occurs in the hard disks 912, 913, and 914 and indicates that the hard disks 912, 913, and 914 normally operate.

If any failure occurs in the hard disk 912, the processor 906 updates the control information 1403 to control information 1603 as shown in FIG. 15A through the HDD controller 911. The control information 1603 is stored in the RAID control area 917 and thus can be updated or not updated following the failure according to circumstances. In the control information 1603 shown in FIG. 15A, an operation status of the hard disk 912 specified as "(abnormal)" means that an operation status of the hard disk 912 is set to "abnormal" if the HDD controller 911 can update the control information 1403. The processor 906 keeps statuses of the hard disk 913 and 914 "normal". Thus, in the case where the processor 906 cannot update the control information 1403 through the HDD controller 911, an operation status of the hard disk 912 is kept "normal". The processor 906 updates the control information 1404 in FIG. 15B, stored in the RAID control area 920, to the control information 1604. The processor 906 updates the status of the hard disk 912 specified in the control information 1404 to "abnormal", and keeps the statuses of the hard disks 913 and 914 "normal". The processor 906 updates the control information 1407 stored in the RAID control area 923 to the control information 1607 shown in FIG. 15C. The processor 906 updates the status of the hard disk 912 specified in the control information 1407 to "abnormal", and continuously sets the statuses of the hard disks 913 and 914 as "normal".

Figures 16A, 16B, 16C:
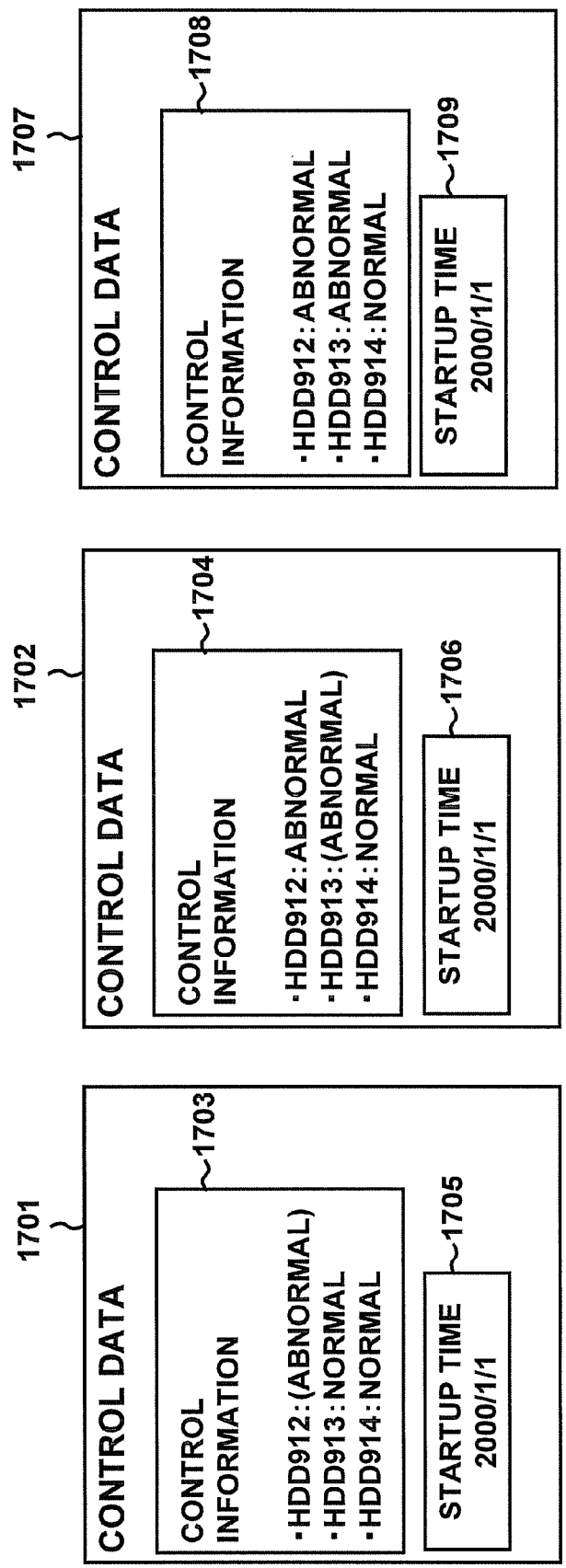
FIGS. 16A, 16B and 16C show control data 1701 and data 1702 stored in RAID control areas 917 and 920 according to an embodiment of the present invention.

Further, if any failure occurs in the hard disk 913, the processor 906 updates the control information 1603, 1604, and 1607 to control information 1703, 1704, and 1708 shown in FIGS. 16A, 16B, and 16C. Operation statues of the hard disks 912 and 913 specified in the control information 1603 in FIG. 16A are "(abnormal)". This means that if the processor 906 can update the control information 1603, operation statuses of the hard disks 112 and 113 are set to "abnormal". Thus, if the processor 906 cannot update the control information 1603, operation statuses of the hard disks 912 and 913 are kept "normal" (similar to the control information 1603). An operation status of the hard disk 912 specified in the control information 1703 in FIG. 16B is "abnormal", an operation status of the hard disk 913 is "(abnormal)", and an operation status of the hard disk 914 is kept "normal". Operations statuses of the hard disks 912 and 913 specified in the control information 1707 in FIG. 16C are "abnormal", and an operation status of the hard disk 914 is kept "normal".

The control information 1403, 1404, 1603, 1604, 1407, 1703, and 1407 indicate whether the hard disks 912, 913, and 914 normally operate. The processor 906 updates the control information as needed. Here, an inconsistency might be found as a result of comparison between control information. The inconsistency means that the hard disks 912, 913, and 914 do not match each other in terms of "normal" or "abnormal" status.

Figure 10:
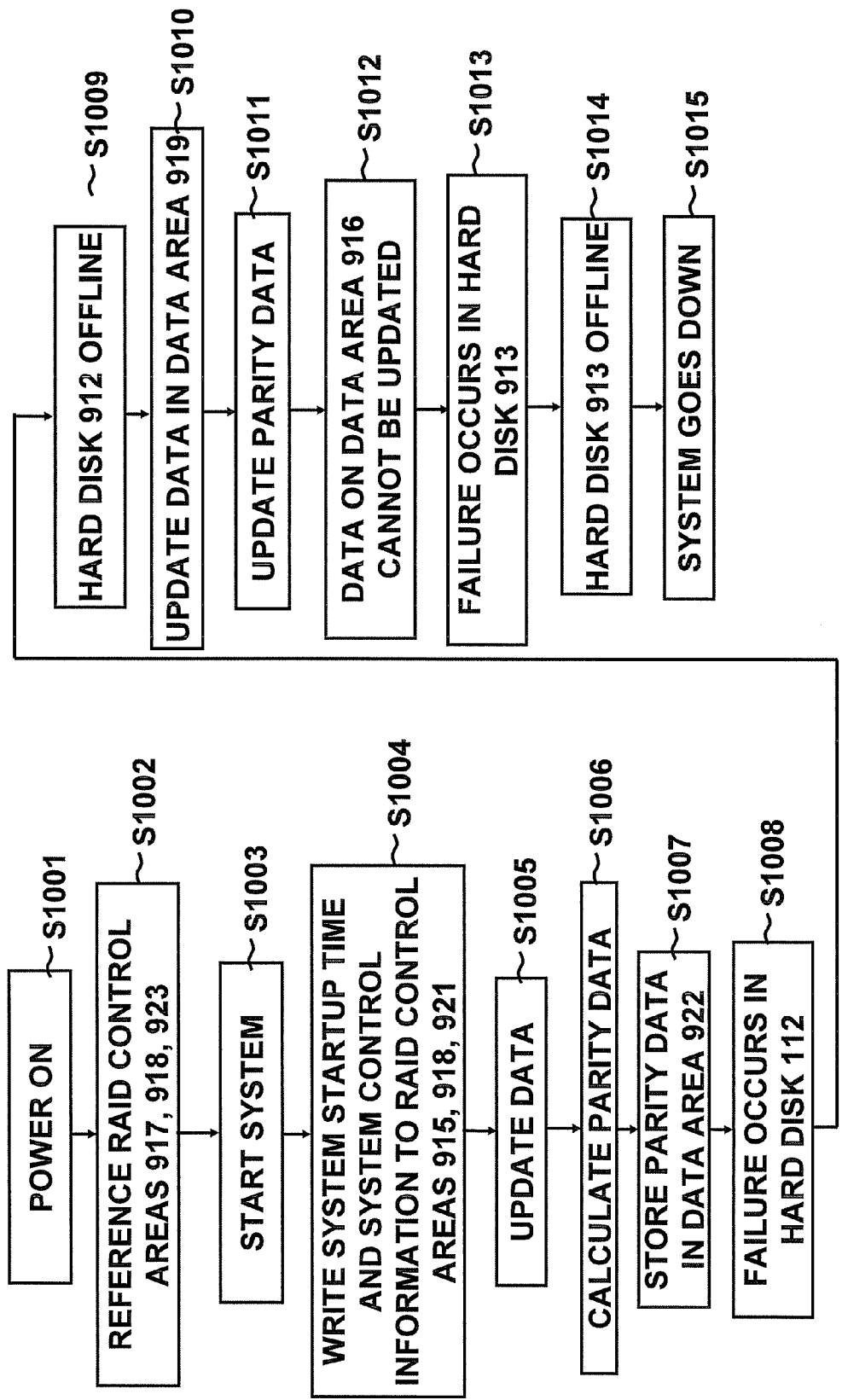
FIG. 10 is a flowchart of recording processing according to an embodiment of the present invention.

Moreover, the HDD controller 111 has a function of detecting an abnormality in the hard disks 912, 913, and 914. To describe a mechanism for detecting an abnormality in detail, for example, the HDD controller 911 sends a diagnostic command signal or the like to the hard disks 912, 913, and 914 to monitor whether a response signal is normally sent back from the hard disks 912, 913, and 914 in response thereto within a predetermined period. Then, if the HDD controller 911 has not received a normal response signal within a predetermined period, the hard disks 912, 913, and 914 are determined to cause an error. If the HDD controller 911 receives a normal response signal within a predetermined period, the hard disks 912, 913, and 914 are determined not to cause an error. Further, it is monitored whether data is normally written or read. Then, if data is not normally written or read, it is determined that any error occurs. FIG. 10 is a flowchart of data recording processing of this embodiment.

This embodiment describes the case in which the hard disk 912 causes a failure and is thus taken offline, after which the hard disk 913 causes a failure and is thus taken offline, thereby making the RAID device 900 multi-dead. As for the order in which the hard disks 912 and 913 are taken offline, the hard disk 912 may be taken offline due to an occurrence of any failure after the hard disk 913 was taken offline due to an occurrence of any failure.

First, a user powers on the RAID device 900 (step S1001). The processor 906 references control information stored in the RAID control areas 917, 920, and 923 (step S1002).

The CPU module 901 reads an OS from each of the system areas 915, 918, and 921 to the memory 907 and starts the system (step S1003). Then, the processor 906 writes the system startup time and system control information to the RAID control areas 917, 920, and 923 to update control data (step S1004). The RAID device 900 records data input from the outside of the RAID device 900 to the data areas 916, 918, and 922 to update data (step S1005). The processor 906 performs exclusive OR between the stripe data in the data area 916 and the stripe data in the data area 919 to calculate parity data (step S1006). Then, the processor 906 stores the parity data in the data area 922 through the HDD controller 911 (step S1007).

After that, a failure occurs in the hard disk 912 (step S1008). The processor 906 takes the hard disk 912 offline (step S1009). Then, the RAID device 900 records data input from the outside of the RAID device 900 to the data area 919 to update data (step S1010). The processor 906 updates parity data in the data area 922 through the HDD controller 911 (step S1011). Since the hard disk 912 is offline, data on the data area 916 cannot be updated (step S1012).

A failure occurs in the hard disk 913 (step S1013). The takes the hard disk 113 is taken offline through the HDD controller 111 (step S1014). Since the hard disks 112 and 113 are offline, the system of the RAID device 900 goes down (step S1015).

FIG. 11 is a flowchart of data record recovery in this embodiment. If both of the hard disks 912 and 913 become offline, and the system goes down in the RAID device 900, a user or the CPU module 101 resets the system (step S1101). Then, the processor 906 tries to reference control information stored in the RAID control areas 917, 920, and 923 (step S1102). The processor 906 determines whether control information in the RAID control areas 917, 920, and 923 can be read (step S1103).

If the control information in the RAID control areas 917, 920, and 923 can be read, the processor 906 references the control information in the RAID control areas 917, 920, and 923.

Then, the processor 906 determines whether such an inconsistency that the RAID control areas 917, 920, and 923 have recorded "abnormal" in each other's hard disk statuses in the control information (step S1104).

If it is determined that the control information in the RAID control areas 917, 920, and 923 have no inconsistency, the processor 906 compares the control information stored in the RAID control areas 917, 920, and 923 to analyze a status just after elimination of redundancy.

The processor 906 determines that the hard disk 913 is taken offline after the hard disk 912 has become offline. Then, the processor 906 makes only the hard disk 913 online (critical status), after which a user or the CPU module 901 starts up the system (step S1105).

On the RAID control area 917, a log of the access time when the HDD controller 911 accesses the hard disk 112 is recorded. Likewise, on the RAID control area 920, a log of the access time when the HDD controller 911 accesses the hard disk 913 is recorded. Likewise, on the RAID control area 923, a log of the access time when the HDD controller 911 accesses the hard disk 914 is recorded. The processor 906 compares the time of access to the hard disk 912, the time of access to the hard disk 913, and the time of access to the hard disk 904 to determine the order in which the hard disks 912 and 913 are taken offline to thereby analyze the status just after elimination of redundancy.

Further, the processor 906 can reference startup time recorded in the system areas 915 and 918 and parity data in the system area 921 as well, and may determine the order in which the hard disks 912 and 913 are taken offline.

If the control information in the RAID control areas 917, 920, and 923 cannot be read (NO in step S1103) or the status just after elimination of redundancy cannot be analyzed because the RAID control areas 917, 920, and 923 have an inconsistency that abnormal is recorded in each other's hard disk statuses in the control information (YES in step S1104), the processor 906 checks whether the memory 907 stores control information representing the status just after elimination of redundancy. The processor 906 sets the HDD controller 911 to disable write to the hard disk 912. Further, the processor 906 determines whether the memory 907 stores information indicating that the hard disk 112 becomes online to confirm that the information is not stored and then, stores information that the disk 912 becomes online in the memory 907 to turn the hard disk 912 online (step S1106). A user turns off the write flags for the hard disks 912, 913, and 914 stored in the memory 907 in advance so as to prevent the HDD controller 911 from writing data to the hard disk 912. As a result, even if the hard disk 912 becomes online, the HDD controller 911 writes no data to the hard disk 912. The HDD controller 911 stores all data written to the hard disks 912 and 914 (inclusive of the system startup time and startup status, etc.) on the data cache 909. The HDD controller 911 may record all data written to the hard disks 912 and 914 on the data buffer 910. The startup status of the hard disk 912 indicates whether the hard disk 912 is online or offline.

The CPU module 901 determines that an OS panics or hangs to hinder normal startup of the system (step S1107). A user of the CPU module 901 resets the system (step S1108). The processor 906 takes the hard disk 912 offline (step S1109). Then, the processor 906 sets the hard disk 913 online and stores information to the effect that the disk 912 becomes offline, and the disks 913 and 914 become online (step S1110).

When an OS is activated normally, the CPU module 901 notifies the processor 906 that the system operates normally and then, sets ON all the write flags in the setup table to reboot the OS. The processor 906 references information representing the status just after elimination of redundancy (information indicating that the disk 912 becomes offline, and the disks 913 and 914 become online in the RAID device 900) in the memory 907.

Then, the processor 906 takes the hard disk 912 offline and sets the hard disks 913 and 914 online, after which normal startup is executed (step S1111). In addition, at this time, an operation status of the hard disk 913 specified in the control information stored in the RAID control areas 920 and 923 is updated to "normal".

After that, the hard disk 912 is replaced by a new hard disk because of a high risk of failure and rebuilt using the hard disks 913 and 914. After the completion of rebuilding, the hard disk 913 is replaced by a new disk in a similar fashion to restore the initial RAID 3 configuration to thereby completely restore the system.

In the RAID device 900 of this embodiment, even if hard disks out of the hard disks 912, 913, and 914 involve any failure, the hard disks can be set online in the correct order, and the system can be normally booted. The order in which the hard disks are taken offline can be determined to prevent erroneous data write to the hard disks 912, 913, and 914. Hence, the RAID device 900 can save the data in the hard disks 912, 913, and 914 from data loss.

The processing executed with determination means of the present invention is included in the processing executed by a processor. The processing executed with startup means is included in the processing executed by the CPU module. The processing executed with storage means of the present invention is included in the processing executed with the data cache and the data buffer. The processing executed with the operation means and specifying means of the present invention is included in the processing executed by the CPU and the processor. The processing executed with the write means of the present invention is included in the processing executed with the HDD controller. Further, in this embodiment, the hard disks 912, 913, and 914 correspond to recording media for recording data, but the recording medium is not limited thereto and a memory as a volatile recording medium or a flash memory as a nonvolatile recording medium may be used.

The storage device according to the present invention restores recorded data. Hence, the storage device of the present invention is very effective for recovering data recorded on a disk involving a failure.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A storage device including a plurality of storage units for storing data dispersively among the storage units, the storage device being capable of operating, when one of the storage units is inoperative on account of a failure therein, with the rest of the storage units, comprising:
    a processor for controlling boot-up of the storage units; and
    a memory for storing operation history indicative of the sequence of any failure causing any of the storage units to become inoperative,
    the processor controlling reboot-up of the storage units, when a plurality of the storage units becomes inoperative on account of a plurality of failures, in accordance with process including:
    determining the order of the reboot up of the storage units that is reversal of the sequence of the failures causing the storage units to become inoperative in reference to the operation history in the memory;
    rebooting the inoperative storage units successively in accordance with the determined order.

2. The storage device according to claim 1, wherein the processor, when rebooting each of the inoperative storage units, writes into each of the storage units data indicative of operation history of each of the storage units including time of reboot-up.

3. The storage device according to claim 1, wherein the processor determines the order of the reboot up of the storage units that is reversal of the sequence of the failures causing the storage units to become inoperative by referring log data stored in the inoperative storage units.

4. The storage device according to claim 1, wherein the processor determines the order of the reboot up of the storage units that is reversal of the sequence of the failures causing the storage units to become inoperative by referring configuration data of the storage device stored in the inoperative storage units.

5. The storage device according to claim 1, wherein the processor determines the order of the reboot up the storage units that is reversal of the sequence of the failures causing the storage units to become inoperative by referring operation status of the apparatus stored in the inoperative storage units.

6. The storage device according to claim 1, wherein the processor writes the same data into the plurality of storage units.

7. The storage device according to claim 1, the processor divides data and writes the plurality of divided data and exclusive OR of the plurality of divided data into the plurality of the storage units.

8. The storage device according to claim 1, wherein the memory is a cache for improving the efficiency of a system which operates on the apparatus.

9. The storage device according to claim 1, wherein the memory is a data buffer for storing data temporally so as to write data in the plurality of storage units.

10. The storage device according to claim 1, wherein the processor writes into each of the storage units data indicative of operation history of each of the storage units including time of reboot-up, after change a flag including the inoperative storage units.

11. A recovery method for recovering data a plurality of storage units which are included in an apparatus for storing data dispersively among the storage units, the apparatus being capable of operating, when one of the storage units is inoperative on account of a failure therein, with the rest of the storage units, comprising:
   determining, when a plurality of the storage units becomes inoperative on account of a plurality of failures, the order of reboot up of the storage units that is reversal of the sequence of the failures causing the storage units to become inoperative in reference to an operation history in a memory, the history being indicative of the sequence of any failure causing any of the storage units to become inoperative;
   rebooting the inoperative storage units successively in accordance with the determined order.

* * * * *